Aug. 6, 1935.  J. H. JAMES  2,010,086
METHOD OF MAKING PARTIAL OXIDATION PRODUCTS
Original Filed Jan. 22, 1919
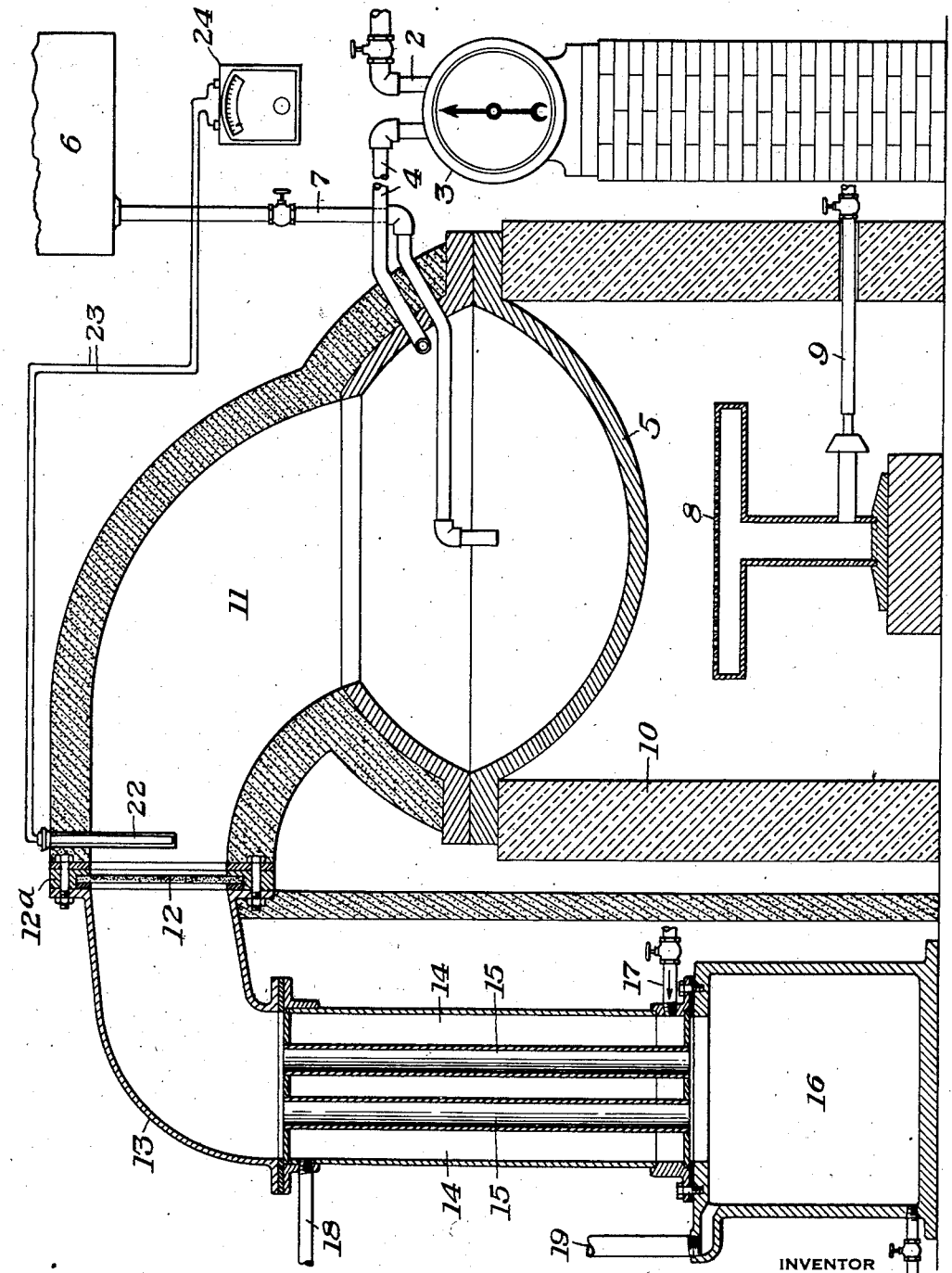
INVENTOR
J H James
by Byrnes Stebbins + Blenko
his attys Patented Aug. 6, 1935

2,010,086

UNITED STATES PATENT OFFICE 2,010,086

METHOD OF MAKING PARTIAL OXIDATION PRODUCTS

Joseph Hidy James, Pittsburgh, Pa., assignor to Clarence P. Byrnes, as trustee, Sewickley, Pa.

Original application January 22, 1919, Serial No. 272,567. Divided and this application July 27, 1934, Serial No. 737,310

10 Claims. (Cl. 260—116)

My invention relates to the partial oxidation of hydrocarbons which are mainly aliphatic, such as mineral oil or a fraction thereof, by mixing the same with air or an oxygen-containing gas and passing the mixture through a hot conversion zone which is maintained at a temperature below that of continuous self-sustained complete combustion, but within the reactive range, preferably in the presence of a catalyst.

The present application is a division of my application Ser. No. 272,567, filed January 22, 1919, and this division relates to the application of my process to unsaturated hydrocarbons.

The oil treated may contain both saturated and unsaturated hydrocarbons of which the unsaturated bodies may, of course, be oxidized more easily at lower temperatures due to the double bonds. The mineral oil employed is preferably one of the heavier and cheaper distillates of crude mineral oil (petroleum) although the process may be applied to crude mineral oil including oil from shales or their distillates or oil from low temperature distillation of lignites or coals.

The process may be carried out with or without a catalyst, although I prefer to use a catalyst in the hot reaction zone.

In carrying out my process in its preferred form the vapor of mineral oil mixed with air in proper proportion is passed with a definite velocity through a thin layer of a suitable catalyst, the catalyst being maintained within a definite range of temperature below a red heat, and preferably below any temperature at which the catalyst will glow or show color from its rise in temperature. All these conditions are interrelated with and interdependent upon each other within certain ranges, but such conditions must be preserved that continuous self-sustained complete combustion does not take place. If continuous self-sustained complete combustion starts and continues, there will be complete combustion of a large part of the hydrocarbon which will form carbon dioxide and water; and such products as may be formed in small quantities are contaminated by the decomposition products. Heat may be supplied to the heated conversion zone, but should be carefully regulated to preserve the proper temperature below that of continuous self-sustained complete combustion.

In my preferred form a high-acidivity catalytic screen is employed, although I have found that a non-catalytic screen may be used, or even a plain tube with sufficient heat applied to it to give the desired reaction, while preventing continuous self-sustained complete combustion. Where the catalytic screen is used, the temperature at which it is maintained will vary somewhat according to the molecular weight of the hydrocarbon used, the particular catalyst employed, the proportions of vapor and air and the speed, but will be below that of continuous self-sustained complete combustion.

The temperature may vary somewhat within the range indicated below a red heat, depending on the proportion of air in the mixture. I have found that I can maintain the desired temperature below that of glowing reaction in the catalyst by lowering the proportion of air as the temperaure is raised or by raising the proportion of air as the temperature is lowered, within certain limits.

The proportion of vapor and air is adjusted relative to the catalyst temperature, so that a continuous kindling or ignition temperature is prevented, thus perventing continuous complete combustion which would injure the process and the products.

The speed of the mixture through the catalytic screen is another factor important in the commercial use of the method. Some catalyzers are more active than others and the more active the catalyzers, the thinner should be the catalytic layer, thus giving a shorter line of contact for a given speed. The proper speed, therefore, depends upon the particular catalyst used. Disadvantages result from providing a catalytic layer thicker than is necessary because continued contact with the catalyst after conversion causes thermal decompositions and secondary reactions, forming products which clog the apparatus and ultimately contaminate the product.

The proportion of air may be varied according to the particular catalyst used, the temperature employed and the speed of the current. The more active the catalyst, the nearer the proportion of air can approach the theoretical amount. The same is the case as to raising the temperature of the catalyst. The more active the catalyst, the higher the temperature, the lower the air proportion may be. With less active catalysts, or with a lower temperature, the greater the proportion of air which should be used.

Furthermore, the products after leaving the catalytic screen should be chilled and condensed as quickly as possible to prevent further reactions or decomposition.

As regards the catalyst employed, I prefer the complex oxides or compounds of metals having a varying valence. All parts of the complex may consist of oxides of the same metal or of different metals. For example, an excellent catalyst in this connection consists of the so-called "blue oxides" of molybdenum, which contain molybdenyl molybdate, $MoO_2MoO_3$, and molybdenyl molybdenite, and are probably all chemical compounds of two or more oxides of molybdenum representing different states of oxidation. These complexes may be regarded as salts, that is, compounds of one or more basic with one or more acid oxides.

Other complexes of value for such catalysts are chromic chromate, $Cr_2O_3CrO_3$, tungsten tungstate, $WO_2WO_3$, the manganese complexes, the vanadium complexes, etc.

The basic and acid parts of these complexes may be formed from oxides of different metals, in which case, each metal or group of metals used should possess varying valence. Examples of this class are:

Uranyl molybdate $UrO_2MoO_3$
Uranyl molybdite $UrO_2MoO_2$
Cobalt molybdate $CoOMoO_3$
Cobalt molybdite $CoOMoO_2$
Uranyl vanadate $UrO_2V_2O_5$
Uranyl vanadite $UrO_2V_2O_4$
etc.

The metals whose complexes I prefer to employ as the acid part of the catalyst, since I have found them to be of high activity in this field are the high melting point electronegative low-atomic-volume metals having an atomic weight above 40. These metals appear on the Lothar Meyer diagram of the periodic series beginning on the descending side of the third peak, descending side of the fourth peak and the descending side of further peaks developed since the date of this diagram. The class includes the following metals: titanium, vanadium, chromium, manganese, zirconium, niobium, molybdenum, tantalum, tungsten and uranium. The basic oxides may be the lower oxides of these metals or may be the oxides of iron, copper, nickel, lanthanum, cobalt, thorium and the eight or nine rare earth metals. In both acid or basic portions there may, of course, be two or more of these combined.

The above recited conditions are necessarily varied to give the best commercial results in accordance with the interaction of the factors described. In the drawing:

The figure is a sectional side elevation showing one form of apparatus for carrying out my invention.

Referring to the accompanying drawing, 2 represents a valved air pipe through which air is supplied under pressure, 3 a meter for the air, and 4 the pipe leading from the meter into a heating and mixing vessel 5. 6 represents a vessel containing liquid hydrocarbon, and 7 a valved pipe leading therefrom into the mixing vessel 5. 8 indicates a burner having a valved supply pipe 9, by which the heat may be regulated. 10 represents the walls of the furnace or heating chamber in which the retort or mixing vessel 6 is set, the heated mixture of hydrocarbon vapor and air passing from the mixing vessel through the channel 11 to the catalytic screen 12. This catalytic screen is shown as having a frame 12a, clamped or bolted between the ends of the channel 11 and the flanged end of the conduit 13, leading to a vertical condenser 14. The products emerging from the catalytic screen pass down through the tubes 15 of the condenser into the vessel 16. 17 represents the valved inlet pipe for water passing into the condenser and 18 the outlet pipe for the circulating water. The vessel 16 is provided with an outlet 19 for fumes, 20 being the valved pipe by which the condenser products are drawn off. Between the condenser and the vessel 16 and the furnace, I preferably provide an insulating screen 21, of some heat insulator to keep the heat of the furnace away from the condensing apparatus. 22 represents a pyrometer which is preferably in the form of an electric couple with its wires 23 leading to an external temperature indicator 24.

As the heated mixture of vapor and air in the proper proportions passes through the catalytic screen under the regulated temperature referred to, partial oxidation or partial combustion takes place, the products being immediately taken to and through the condenser, and the desired product collecting in the vessel succeeding the condenser. The condensing apparatus may, of course, be of any desirable type, either in single or multiple form. I may in some cases lead pipe 19 to a scrubbing system to recover any uncondensed products. This is desirable where lighter oils are treated.

I will now describe some specific examples of my process:

(1) Using a catalyst "blue oxides" of molybdenum, the coated asbestos screen being one centimeter thick and 4.4 centimeters diameter. The oil used was a gas oil fraction distilling from 250 to 295° C. The air rate was two liters per minute or 1.6 times the theoretical amount required for aldehyde fatty acid formation. The absorbers consisted of eight water bubblers. The oil was fed at the rate of 126 cubic centimeters per hour. The time of contact with the catalyst was .32 second; temperature of the catalyst was maintained at about 270° C.; duration of the run was 1 hour, 35 minutes. A test of the exit gas showed 2.4% of carbon dioxide and 1% of oxygen. 150 cubic centimeters of liquid oxidation products were recovered, of which 85% by volume consisted of aldehyde fatty acids, and 15% by volume of aldehydes, unchanged hydrocarbons, etc. This amounted to 67% by volume, or 70% by weight of the hydrocarbon recovered as aldehyde fatty acids.

(2) The catalyst consisted of uranyl molybdate and uranyl molybdite on asbestos, 1.25 centimeters thick and 4.4 centimeters in diameter. The oil used was kerosene distilling at 250 to 295° C. the air rate was 4 liters per minute, the condensing and absorbing system consisting of two worm condensers and four water bubblers. The oil was entered at the rate of 200 centimeters per hour. The time of contact was about .33 second. The temperature of the catalyst was maintained at about 310 degrees C. Duration of the run—33 minutes. As a result 76 cubic centimeters of liquid product were recovered, which, on analysis, gave aldehyde fatty acids about 30% and aldehydes, etc., about 70%.

This run was made to show the temperature effect, the temperature being lower than that proper for the other interdependent conditions.

In the next test, I established a more nearly correct temperature as follows:

(3) The conditions were all the same as with the second run, except that the temperature of the catalyst was maintained at about 420 degrees C. As a result of this test, 70 cubic centimeters of liquid product were recovered which gave the following analysis: aldehyde fatty acids 62.5%; aldehydes 33.75% and hydrocarbons, etc., 3.75%.

To show the effect of increasing the proportion of air in the mixture, I ran another test substantially like No. 1, above recited, except that the air was fed at the rate of about 10 liters per minute or 66 times the theoretical amount required for fatty acid formation. In this case, the oil feed was 15 centimeters per hour; the time of contact with the catalyst about .03 second; and the duration of the run about 3 hr. 20 min., the temperature of the catalyst being 260 to 280 degrees C. In this case, .756 gram of a dark tacky resinous acid mixture was recovered, amounting to about 18% by weight of the weight of hydrocarbon treated. This shows the effect of too high a ratio of air under the conditions named.

With an apparatus for larger scale operation, practically identical with that figure in the drawing accompanying this specification, the following run was made.

Conditions (a) Catalyst: "blue oxides" of molybdenum on asbestos, held between parallel screens as shown in figure, the active material, packed in the disk-shaped space 15 inches in diameter and ⅔ of an inch thick.

(b) Hydrocarbon mixture treated: "mineral seal oil", a Pennsylvania petroleum distillate, 90% of which distilled between 250 and 324 degrees C. The distillate had a specific gravity of .8125 at 20 degrees C.

(c) Air rate: about 216 cubic feet per hour.

(d) Absorbing system: no scrubbers, only the parallel tube condenser as shown in figure.

(e) Oil feed: 2.5 gallons per hour.

(f) Time of contact of h. c. vapor-air mixture with catalyst; approximately .3 second.

(g) Temperature of catalyst: 310 to 320 degrees C.

(h) Total time consumed in run: 2 hours.

Results (a) Carbon dioxide analysis (by volume) in exit gas stream during run: (.6%, 1% and .8%).

Carbon monoxide analysis (by volume) in exit gas stream during run: (6.8% 8%).

(b) 3.7 gallons of product (having specific gravity at 20 degrees C. of .852) were recovered which had the following analysis: aldehyde fatty acids, 66% by volume, aldehydes 27.2% leaving undetermined 6.8% by volume).

Actual recovery of aldehyde acids, by weight, based on weight of hydrocarbon mixture treated: 50.7%.

The above examples in connection with the description of the apparatus and operation will sufficiently disclose to those skilled in chemistry the essentials of the process, under the conditions recited above.

From the experimental data which I have obtained, I believe that the formation of these aldehyde acids takes place in stages as follows:

With the straight-chain hydrocarbon vapor-air mixture entering the catalytic mass, there is just as much probability of one end of each hydrocarbon chain being oxidized as of the other and since aldehydes predominate at lower temperatures and with retarding agents such as steam, the oxidation must proceed in steps, the aldehyde stage preceding the acid stage. Since the acids obtained are always aldehyde acids, and not simply fatty acids, it seems conclusive that the particular aldehydes whose formation immediately precedes that of the aldehyde acids, must be the di-aldehydes corresponding to the particular aldehyde acids formed.

The variable factors, such as temperature, proportions of air and vapor, speed of current, etc. vary within certain limits depending on each other and on the particular catalysts used and its thickness. In general, I prefer to use the more active and energetic catalysts, such as above named, since I have found that the more active and energetic the catalyst, the lower can be the temperature; and the higher the speed, the lower the "time of sojourn", as it may be called, of the vapor air mixture in contact with the catalyst of given thickness. The catalytic layer should, however, be relatively thin in all cases.

Steam may be introduced into the mixture, especially where predominance of products short of the acids is desired. A close study of the results of many experiments leads me to believe that at this low temperature, oxidation takes place in definite steps—from less oxidation to greater or further oxidation and steam admitted in sufficient quantity produces a retarding effect in the continuing oxidation.

With catalysts of lower activity, such as uranyl molybdate under proper conditions and with no steam, I can at a lower temperature obtain a product in which aldehydes predominate, and at a higher temperature one in which fatty acids predominate.

The temperature range which I have employed extends from about 230 up to about 450° C. In all cases, the temperature of the catalyst should be below a glow temperature or one which gives a decided heat color to the catalyst. The lowest reacting temperatures for successful commercial operation have been obtained with a catalyst consisting of intermediate complex compounds of oxides of molybdenum. The next lowest temperatures have been used with catalyst consisting of compounds of molybdenum with other metallic oxides of the group named above.

The temperature of the catalyst should be carefully regulated, the proportions of the mixture should be carefully maintained between certain limits, depending on the average molecular weight of the hydrocarbon treated, the time of sojourn (time of contact with the catalyst), and the temperature.

With an active catalyst at the highest temperature consistent with commercial yield of a given quantity of product, the proportion of air should be at or above that required by theory for the product desired, the temperature, of course, being kept below that where decomposition products in large quantities are formed, or the products of complete combustion, namely, $CO_2 + H_2O$ form to a large extent. I have, in my example, disclosed the time of sojourn in certain cases. The speed of the stream and the time of contact will vary with the catalyst, the more active catalysts allowing higher speed. With the same catalyst, a higher temperature within the range above described will permit of higher speeds. With the same catalyst and a proper lower temperature, the formation of aldehydes will permit of lower speed than those of aldehyde fatty acid formation under the same conditions. The latter remarks also apply to the time of contact, since the more active the catalyst, the higher the temperature within the described limits, the shorter the time of contact required.

The process may be carried out without a catalist, the mixture being passed through a tube, a certain zone of which is kept heated to a temperature such as that before described. That is, this zone of the tube is heated to a point which will give the desired reaction without starting self-sustained combustion. I may also use a heated metallic screen instead of heating the walls of the tube, the screen being of non-catalytic material. Such process, however, gives a relatively low yield as compared with my preferred catalytic form.

By the words "mineral oil" in the claims, I intend to cover crude mineral oil or shale oil, or their distillates, preferably the heavier and cheaper distillates, or the products of low-temperature distillation of lignites or coals, these being generally termed "aliphatic hydrocarbons" of both the saturated and unsaturated type.

The claims of this divisional case are limited to the use of my process on hydrocarbons containing a material proportion of unsaturated bodies, as well as the product produced by partial oxidation of hydrocarbon containing a material proportion of unsaturated bodies.

My Reissue Patent No. 18,522 of July 12, 1934 contains broad generic claims to my partial oxidation process, whether applied to saturated or unsaturated hydrocarbons, and also to a generic product thereof. My parent application Ser. No. 272,567, above referred to and now involved in interference, will contain any counts of said interference which are won by me and can be drawn in said application.

The advantages of my invention will be apparent to those skilled in the art since a commercially practicable method is afforded by which oxygen derivatives of hydrocarbons may be easily and cheaply made from hydrocarbons containing a material or larger percentage of unsaturated bodies.

If distillates, solid at ordinary temperatures, are used as the raw material, I may liquefy these hydrocarbons by heat and then vaporize them during the process.

A catalyst may or may not be employed, variable factors may be changed, the apparatus employed may be widely varied, and other changes may be made without departing from my invention.

I claim:

1. In the process of making partial oxidation products, the steps consisting of mixing hydrocarbon containing a material proportion of unsaturated hydrocarbon in finely divided condition with air in measured amounts, and passing the same through a hot reaction zone at a reactive temperature below red heat.

2. In the process of making partial oxidation products, the steps consisting of mixing hydrocarbon containing a material proportion of unsaturated hydrocarbon in finely divided condition with air in measured amounts, and passing the mixture over a catalytic mass at a reactive temperature below red heat.

3. In the process of making partial oxidation products, the steps consisting of mixing unsaturated hydrocarbons in vapor or gaseous phase with air in measured amounts, and passing the same through a hot reaction zone at a reactive temperature below red heat.

4. In the process of making partial oxidation products, the steps consisting of mixing unsaturated hydrocarbon in finely divided condition with air in measured amounts, and passing the same through a hot reaction zone at a reactive temperature below that of continuous self-sustained combustion.

5. In the process of making partial oxidation products, the steps consisting of mixing unsaturated hydrocarbon in finely divided condition with air in measured amounts, and passing the mixture in contact with a catalyst at a reactive temperature below that of continuous self-sustained combustion.

6. In the process of making partial oxidation products, the steps consisting of mixing hydrocarbon containing a material proportion of unsaturated hydrocarbon in finely divided condition with a gas containing free oxygen, and passing the same through a hot reaction zone at a reactive temperature below that of continuous self-sustained complete combustion.

7. In the process of making partial oxidation products, the steps consisting of mixing aliphatic hydrocarbon containing a material proportion of unsaturated hydrocarbon in finely divided condition with a gas containing free oxygen, and passing the same through a hot reaction zone at a reactive temperature below that of continuous self-sustained complete combustion.

8. In the process of making partial oxidation products, the steps consisting of mixing mineral oil containing a material proportion of unsaturated hydrocarbon in finely divided condition with a gas containing free oxygen, and passing the same through a hot reaction zone at a reactive temperature below that of continuous self-sustained complete combustion.

9. As a new composition of matter, the product of vapor or gaseous phase partial oxidation of liquid aliphatic hydrocarbons by free oxygen, said product containing a mixture of oxygen derivatives of hydrocarbons in the range from alcohols to organic acids and containing a material percentage of unsaturated-bond bodies produced in said partial oxidation step.

10. As a new composition of matter, the product of vapor or gaseous phase partial oxidation by free oxygen of aliphatic hydrocarbon containing a material percentage of unsaturated bodies, said product containing a mixture of oxygen derivatives of hydrocarbon in the range from alcohols to organic acids and containing a material percentage of unsaturated bodies.

JOSEPH HIDY JAMES.